United States Patent [19]
Laing

[11] 3,748,000
[45] July 24, 1973

[54] SPHERICAL BEARINGS

[76] Inventor: Nikolaus Laing, Hofener Weg 35-37, Aldingen bei Stuttgart, Germany

[22] Filed: Sept. 21, 1971

[21] Appl. No.: 182,503

[30] Foreign Application Priority Data
Sept. 25, 1970 Austria.................................. 86660

[52] U.S. Cl. ................................................. 308/9
[51] Int. Cl. .......................................... F16c 17/16
[58] Field of Search......................... 308/90, 122 A

[56] References Cited
UNITED STATES PATENTS
3,439,962  4/1969  Gothberg............................. 308/9

Primary Examiner—Charles J. Myhre
Assistant Examiner—Frank Susko
Attorney—Pennie, Edmonds, Morton, Taylor and Adams

[57] ABSTRACT

Spherical bearing construction having two cups engaging a ball wherein at least one of the cups has an effective frictional area which is asymmetrical with reference to the axis of rotation of the cup with respect to the ball.

9 Claims, 9 Drawing Figures

Patented July 24, 1973

INVENTOR

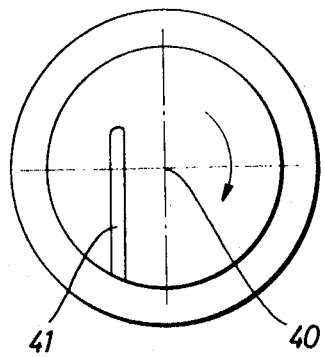
FIG. 4
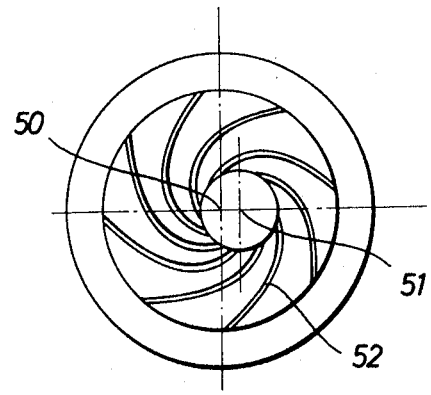
FIG. 5
FIG. 6
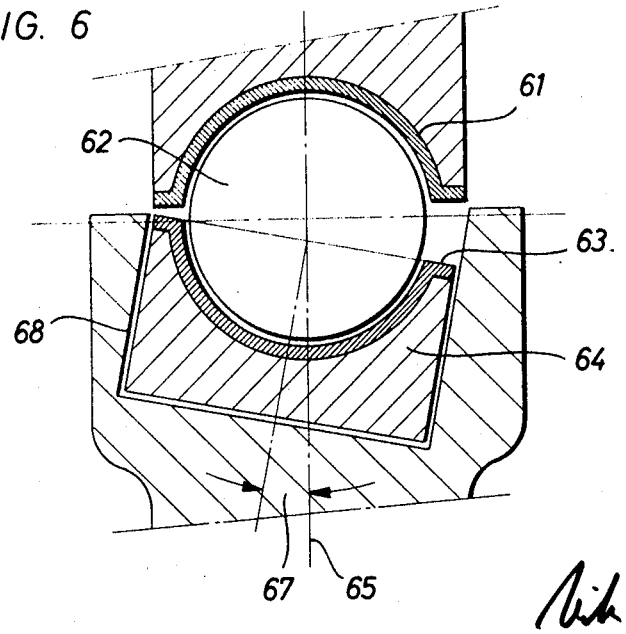

Patented July 24, 1973

INVENTOR

SPHERICAL BEARINGS

DESCRIPTION OF THE INVENTION

This invention is concerned with spherical plain bearings, for example for tiltably supported pump impellers, which have a first concave spherical surface associated with a first relatively rotating component and a second concave spherical surface associated with a second relatively rotating component where the concave surfaces are considered as cups. A ball is positioned between the cups so that the bearing thus constituted can support radial loads, and axial loads in one sense of direction, whilst permitting universal tilting within a prescribed angular range. The invention may also be employed in the form of two bearings axially spaced along the axis of a rotatable element such as a shaft, so as to permit angular variations between the axis of the element and the axes of its two supporting cups.

All plain bearings, irrespective of whether they operate with full hydrodynamic lubrication or with either or total or partial contact friction, have a drawback inasmuch as abrasive damage may be caused by dirt, or by breaking away of surface material, or by so-called "picking up" which occurs if the surfaces unite or become locally bonded. Thus, grooves may be formed by scoring, leading rapidly to failure. Such scoring may take place not only in plain journal bearings but also in plain spherical bearings i.e. those in which the spherically formed cooperating concave and convex surface are concentric. The invention is concerned with spherical plain bearings, and seeks to avoid the aforementioned drawback, and to be highly immune to wear.

SUMMARY OF THE INVENTION

In bearings according to the invention, the surface of a cup of a spherical bearing is so formed that, apart from a friction torque about the axis of rotation, there may be generated friction torques about axes lying at an angle to the axis of rotation. In this way, the ball performs not only a relative motion in relation to such cup (which ideally would be a rotation at half the relative speed of the cups) but, in addition, the ball continuously alters its orientations inasmuch as it turns about axes which do not coincide with the axis of rotation, thereby continuously changing its inclination. This additional motion ensures the avoidance of the damaging scoring effect.

According to the invention a spherical bearing therefore comprises two concave cups embracing a ball, the cups and ball all being relatively rotatable with the cups having their respective axes of rotation congruent at the centre of the ball and with at least one of the cups having its effective friction area so disposed as to result in torque between that cup and the ball which torque is asymmetrical with reference to the axis of rotation of that cup.

The invention further resides in a spherical bearing comprising two concave cups embracing a ball, the cups and ball all being relatively rotatable with the cups having their respective axes of rotation such as to be capable of universal angular inclination within a limited angle and with at least one of the cups having its bearing surface so constituted as to have its frictionally effective bearing area asymmetrically disposed about its rotational axis.

The invention includes spherical bearings as above stated in which a spherically-formed concave surface cooperates with a spherically-formed convex surface to afford universal freedom therebetween within an angular limit of operation as well as freedom of relative rotation and in which the concave surface is frictionally asymmetrical about any axis of relative rotation within such limit.

It will become clear from the more detailed description that terms are used herein such as "frictionally asymmetrical" and "centre of symmetry of a cup" which require interpretation in the context of the description and of the intended function. The "centre of symmetry" of a cup is the point on its bearing surface which is substantially equidistant from its circular margin. "Frictionally asymmetrical" and similar language refers to a distribution of the bearing area such that the friction it generates by sliding on the bearing ball will set up an unbalanced torque. This phraseology turns on the notion that a frictional surface has a "centre of friction" which is an imaginary point about which the mathematic sum of all frictional forces on the surface results in zero torque.

The means by which this function of the invention is performed consists in so forming positioning at least one of the bearing cups that its effective friction-generating bearing surface is arranged to be asymmetrical as to its frictional effect in respect of the median axis of rotation of the bearing.

Another way of performing the invention consists in providing the bearing surface of at least one of the bearing cups with surface materials or regions having different friction coefficients, the distribution of the different regions being asymmetrical in the foregoing sense. The aim of the invention can also be accomplished by arranging an edge of the cup obliquely or helically. The same effect may be achieved by providing spiral groove bearings or bearings having other groove-like means for attaining hydrodynamic lubrication, by forming the grooves in such a way that they are asymmetrical with reference to the axis of rotation. Finally, recesses in the cup surface arranged asymmetrically to the axis of rotation may be used to perform the invention.

If, apart from axial forces, the bearing is also subject to radial forces and one cup is fixed, as is the case, owing to the rotor weight in machines with horizontal axis, the invention provides for an inclination of the fixed cup in such a way that, viewed from the ball centre, the geometric axis of the cup or else the geometric axis through the centre of the spiral groove array or of the array of surface materials, is shifted downwards so far as its effect is concerned.

In order to avoid that a particular region of bearing surface carries a higher load than the remainder, its non-rotating cup can be made free to rotate in relation to its support. The desired secondary motion of the ball is then imposed by reason of the axis of such rotation being inclined to the median axis of relative rotation.

DESCRIPTION OF THE DRAWINGS

The invention will now be described with the help of the accompanying drawings, in which:

FIG. 4 illustrates a design with a region indicated as made of a different material from the remainder of the bearing surface.

FIG. 5 illustrates an embodiment with asymmetrical but generally spiral grooves.

FIG. 6 illustrates an embodiment with a bearing cup free to swivel.

DESCRIPTION OF THE PREFERRED EMBODIMENTS

Figure 1:
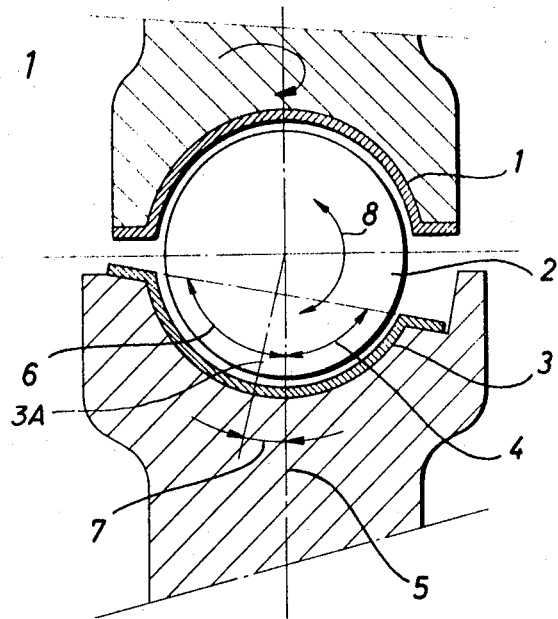
FIG. 1 illustrates in cross-section, a spherical bearing according to the invention with a ball motion at right angles to the axis of rotation.

In FIG. 1a a spherical bearing according to the invention is illustrated in cross-section. The first bearing cup 1 rotates in relation to second cup 3. The bearing cup 3 is non-rotating and its axis 3A is inclined at an angle 7 to the median axis 5, which is the common axis about which 1 and 3 relatively rotate when the bearing is in its median condition, i.e. when there is no universal angular misalignment. In this way, the friction in the angular range 6 is larger than in the angular range 4, because the bearing area to the left (in FIG. 1) of the axis 5 is greater than to the right. This causes the ball as it rotates, to perform a secondary motion as indicated by the arrow 8, so that its orientation continuously changes.

Figure 2:
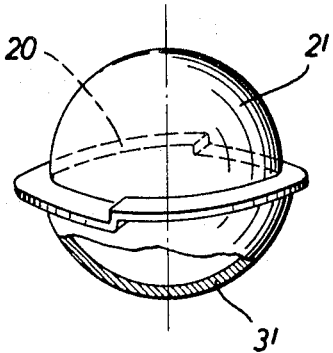
FIG. 2 illustrates an embodiment of the cup with an edge along a helical line.

FIG. 2 illustrates a cup 3', which, in cooperation with an identical or a symmetrical cup, imposes a secondary motion upon the ball 2' because the rotating cup edge 20 lies along a helical line.

Figure 3:
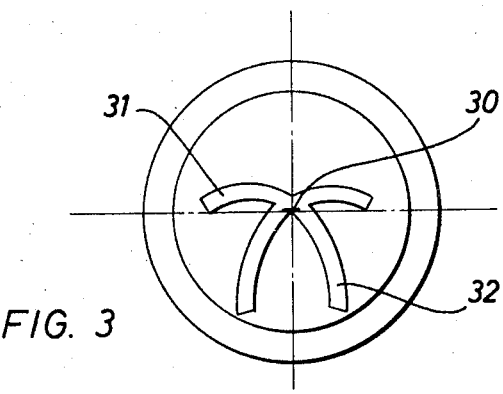
FIG. 3 illustrates a cup with intersecting hydrodynamic grooves.

FIG. 3 illustrates, in a view along the axis at 30, the bearing surface of a cup with two crossing hydrodynamic grooves 31 and 32.

FIG. 4 illustrates an arrangement, viewed along the axis 40, in which only a single groove 41 is eccentric to and shifted from the centre; it is filled with a material which has a different friction coefficient from the material of the remainder bearing surface of the cup. Therefore it exerts a non-symmetrical frictional component upon the bearing surface of the ball 2. Suitable material pairs are, for example, metal carbides for the dominant area of the cup and metallic materials for the filling of the groove; or, for example, graphite for the cup surface and synthetic resin in the groove; or synthetic resin bonded graphite for the cup surface and babbitt-metal in the groove. In place of a groove formed along a chord, differently shaped, eccentrically arranged arbitrary configurations may be used.

FIG. 5 shows a view of the concave bearing surface of a cup with spiral hydrodynamic grooves. The centre, indicated at 51, of the spiral groove 52 which is intended to be of very small depth is arranged eccentrically to the axis of rotation 50.

FIG. 6 illustrates an arrangment which is somewhat similar to that of FIG. 1. In this, one of the cups indicated at 61 is advantageously surfaced symmetrically. The second cup 63, is arranged with its perimeter at an angle 67 to the median axis 65 of rotation. The cup 63 is set in a cylindrical boss 64. This boss 64 is free to rotate in an inclined cylindrical bore 68. This arrangement is particularly suitable for hydrodynamic bearings. In hydrodynamic bearings, the starting torque is often a hundred times larger than after the completed formation of the hydrodynamic lubricating film. Accordingly, a bearing with an obliquely borne cup such as 63, may only rotate during the starting and stopping phases and thereby causes a repositioning of the ball 62 during such phases. After formation of the hydrodynamic lubricating film a cutting of grooves by scoring is in any case impossible.

Figure 7:
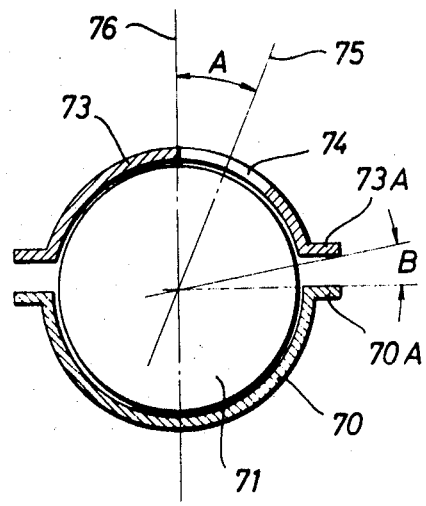
FIG. 7 illustrates the essential elements of a further variant and FIG. 7A a sub-variant thereof.

In FIG. 7 the stationary cup 70 is shown rotatably supporting the ball 71 which is also engaged by the rotatable cup 73. The cups shown are in the form of moulded shells, for example of hard, low-friction material such as silicon nitride, of which the concave bearing surface is finished by accurate grinding. The shells will be supported in known manner by the elements between which the bearing operates, and have respective flanges 70A, 73A, around their circular margins.

Both to provide the required asymmetry of surface and to facilitate the grinding operation the cup 73 has a circular aperture 74. The centre of this aperture lies on a diameter 75 passing through the centre of the ball 71 and inclined by angle A to the common axis 76 of the two cups and the ball when the cups are in their median or "coaxial" position as drawn. An angle B is illustrated, which represents the maximum limit of angular universal freedom between the cups when misaligned from the median. Angle B is somewhat less than angle A and it follows that, whatever angle the cups are relatively at, the centre of friction of the effective bearing area of cup 73 is (by virtue of the aperture 74) always asymmetrical in respect of the axis line 76 and this produces the desired secondary rotation of ball 71.

Figure 7A:
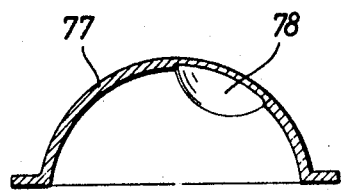

FIG. 7A shows the cup 77 which is essenially the same as 73, but instead of the aperture 74 there is now a sunk circular relief at 78 which, again, facilitates grinding of the moulding and causes asymmetrical friction. The relief at 78 may also be instrumental in developing hydrodynamic pressure in fluid in the bearing.

Figure 8:
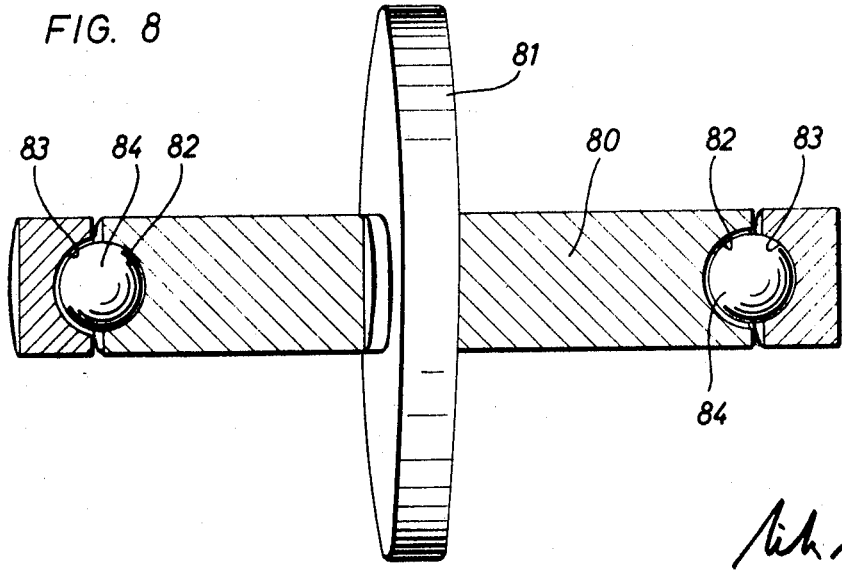
FIG. 8 illustrates a rotatable shaft-like element with two bearings according to the invention.

In FIG. 8 there is shown a shaft element 80 supporting a rotor 81 the nature of which does not concern the invention. The shaft is to be borne at its two axially-spaced ends by spherical bearings each including a rotary cup 82, a fixedly-mounted cup 83 and a ball 84. Each bearing cup 82 is constituted with asymmetry, as in the preceding descriptions. Such arrangement allows some universal freedom, in the sense that the fixed cups 83 may be misaligned (either as to their relative angle or in parallelism with each other) the shaft 80 then taking up whatever relative angular attitude is dictated by the circumstances. The rotor 81 may for example be that of an electrical machine, or of a pump or other fluid machine. One of the cups 83 may be mounted under resilient axial load to maintain some and thrust in the shaft 80.

I claim:

1. A spherical bearing comprising two cups each having a spherically concave shaped bearing surface, a ball engaged by the cups, the caps and ball all being relatively rotatable, the cups having their respective axis of rotation congruent at the center of the ball, and at least one cup having asymmetrical effective frictional area means on its bearing surface whereby when said ball is rotated with respect to said one cup, a torque is produced between said one cup and said ball which is asymmetrical with reference to the axis of rotation between said one cup and ball.

2. A spherical bearing according to claim 1 wherein one of the said cups is universally pivotable with respect to said ball within a limited angular inclination.

3. A spherical bearing comprising two cups each having a spherically concave shaped bearing surface, a ball engaged by the cups, the cups and ball all being relatively rotatable, the cups having their respective axes of rotation congruent at the center of the ball, the cups being universally pivotable with respect to each other within a limited angular inclination, and at least one cup having asymmetrical effective frictional area means on its bearing surface whereby when said ball is rotated with respect to said one cup, a torque is produced between said one cup and ball which is asymmetrical with reference to the axis of rotation between said one cup and ball.

4. A spherical bearing comprising two cups each having a spherically concave shaped bearing surface, a ball engaged by the cups, the cups and ball all being relatively rotatable, the cups having their respective axis of rotation congruent at the center of the ball, and at least one cup having its spherically formed concave bearing surface interrupted by spiral grooves radiating from a center which is spaced from the center of symmetry of the cup whereby the effective frictional area of said one cup with respect to the ball is so disposed to result in torque between said one cup and the ball which is asymmetrical with said respective axis of rotation.

5. A spherical bearing comprising two cups each having a spherically concave shaped bearing surface, a ball engaged by the cups, the cups and ball all being relatively rotatable, the cups having their respective axis of rotation congruent at the center of the ball, and at least one cup having its spherical concave bearing surface interrupted by one or more grooves which transverse the surface to occupy an area the effective center of which is spaced from the center of symmetry of the cup whereby the effective frictional areas of said one cup with respect to the ball is so disposed to result in torque between said one cup and the ball which is asymmetrical with said respective axis of rotation.

6. A spherical bearing comprising two cups each having a spherically concave shaped bearing surface, a ball engaged by the cups, the cups and ball all being relatively rotatable, the cups having their respective axis of rotation congruent at the center of the ball, and at least one of the cups having in its spherically shaped concave bearing surface an area of circular profile which is relived in depth and which area has its center spaced from the center of symmetry of the cup whereby the effective frictional area of said one cup with respect to the ball is so disposed to result in torque between said one cup and the ball which is asymmetrical with said respective axis of rotation.

7. A spherical bearing comprising two cups each having a spherical bearing surface, a ball engaged by the cups, the cups and ball all being relatively rotatable about a common axis, the cups having their respective axis of rotation congruent at the center of the ball, and one cup being mounted such that its center of of symmetry is spaced from said axis whereby its effective frictional area with respect to the ball is so disposed to resut in torque between said one cup and the ball which is asymmetrical to said common axis.

8. A spherical bearing according to claim 7 in which said one cup is rotatably mounted in a bearing means the axis of rotation of which is inclined to said common axis.

9. A spherical bearing comprising two cups each having a spherically concave shaped bearing surface, a ball engaged by the cups, the cups and ball all being relatively rotatable, the cups having their respective axis of rotation congruent at the center of the ball, and at least one of the cups having its spherically formed concave bearing surface comprising materials having different frictional coefficients with said materials being distributed asymmetrically over the concave surface with respect to the center of symmetry of the cup such that the effective frictional area of said one cup with respect to the ball is so disposed to result in torque between said one cup and the ball which is asymmetrical with reference to said respective axis of rotation.

* * * * *